Figure 1:
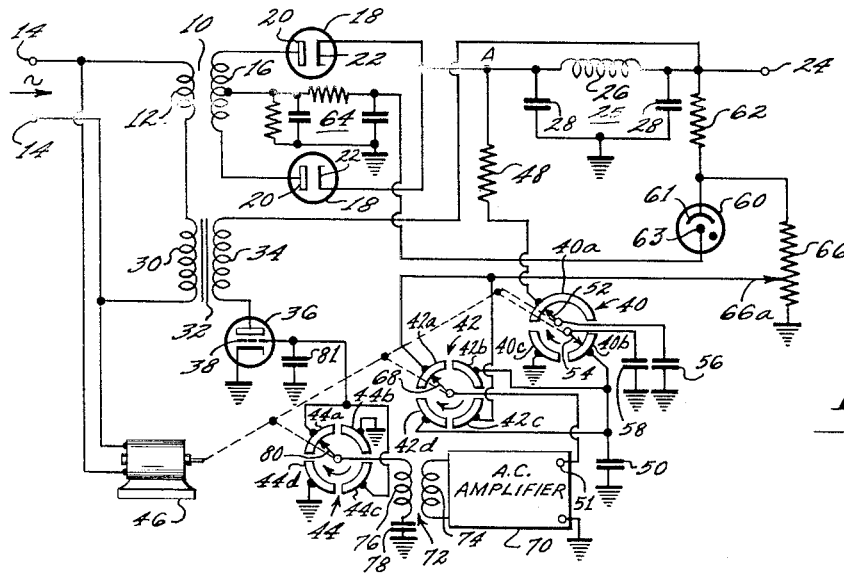

Dec. 22, 1953  J. N. MARSHALL  2,663,839
REGULATED POWER SUPPLY
Filed May 13, 1950

INVENTOR
John N. Marshall
BY
ATTORNEY

Patented Dec. 22, 1953

2,663,839

UNITED STATES PATENT OFFICE 2,663,839

REGULATED POWER SUPPLY

John N. Marshall, Bryn Mawr, Pa., assignor to Radio Corporation of America, a corporation of Delaware Application May 13, 1950, Serial No. 161,809

9 Claims. (Cl. 321—10)

This invention relates to improvements in systems for converting pulsating unidirectional voltages into non-pulsating unidirectional voltage, and while not limited thereto finds particular application in regulated power supplies.

Rectifying systems for converting alternating voltage to unidirectional voltage are widely used in electrical apparatus, as in so-called detector circuits, power supply circuits and the like. Since the unidirectional voltage obtained from the rectifier has a pulsating component, it is usual to pass the rectifier output voltage through a filter network to smooth out this pulsating component. In the filter, an "inertia" effect is provided which tends to eliminate the peaks and valleys of the pulsating component.

In some instances, the inertia effect of a conventional filter network produces undesirable results. For example, unidirectional voltage from a rectifier sometimes is compared with a fixed unidirectional reference voltage to obtain a difference voltage for control purposes. This difference voltage may be fed back to control the rectifier input, as in a regulated power supply system, or may be utilized for other control purposes, as in so-called "follow-up" or servo systems and the like. In such cases, inertia effect in the filter network may slow down the system response to such an extent that oscillation or "hunting" takes place. On the other hand, the pulsating component of the rectifier output must be removed for proper operation.

It is, accordingly, a general object of the present invention to provide an improved system for converting pulsating unidirectional voltage into non-pulsating unidirectional voltage and without relaying on the inertia effect common to conventional filter networks.

Another object of the invention is the provision of a system for obtaining from a pulsating unidirectional voltage a unidirectional voltage of magnitude proportional to the mean or average value of the pulsating voltage.

An ancillary object of the invention is the provision of an improved regulated power supply system.

Another object of the invention is to provide an improved voltage feedback network for regulating a rectifier type power supply through the medium of a saturable reactor or the like.

In accordance with the invention, the foregoing and other related objects and advantages are attained by providing means for sampling the output voltage of a rectifier system once during each pulse in the pulsating output voltage of the system. The voltage samples are developed on a first storage capacitor and then transferred to a second storage capacitor during intervals between the initial storing action. This isolates the second capacitor from the pulsating component of the system output. The voltage on the second capacitor then can be compared with a standard reference voltage for control purposes or can be utilized in any desired manner. In the system selected to illustrate an application of the invention, a saturable reactor (defined hereinafter) is connected in the alternating voltage supply line of a rectifier system to correct the rectifier input voltage as a function of the difference between a standard voltage and voltage samples obtained in accordance with the invention.

Figure 2:
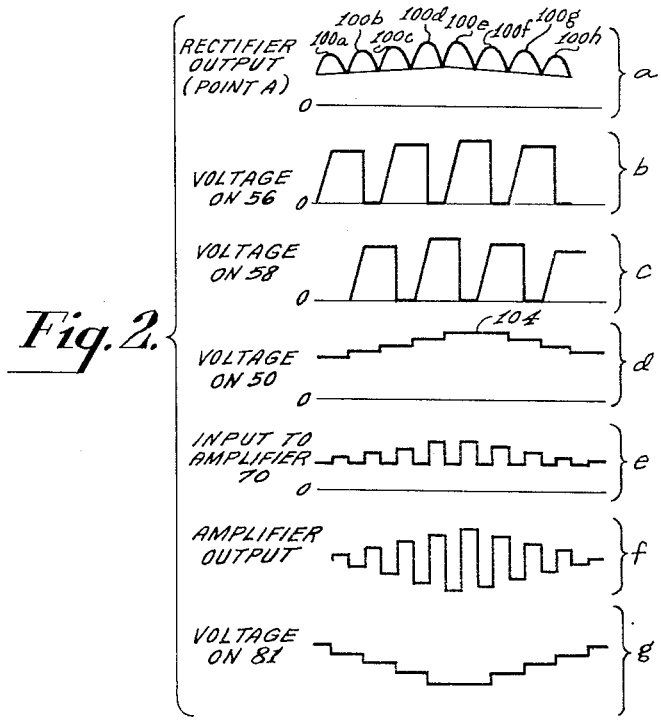

A more complete understanding of the invention can be had by reference to the following description of an illustrative embodiment thereof, when considered in connection with the accompanying drawing, wherein:

Figure 1 is a schematic diagram of a regulated power supply arranged in accordance with the invention, and Figure 2 illustrates the wave forms at various points in the circuit of Figure 1.

It has previously been proposed to regulate the output voltage of a rectifier-type power supply by means of a so-called saturable reactor connected in the alternating voltage input circuit of the power supply. The term "saturable reactor," as used herein and in the appended claims, designates a device having at least two electro-magnetically coupled windings. The alternating current impedance of one of the windings, referred to as the controlled winding, is a function of the amount of unidirectional current flowing in another of the windings, referred to as the control winding. By adjusting the current through the control winding of the reactor as a function of the output voltage of the power supply, the power supply input voltage can be adjusted to maintain a substantially constant output voltage. A system of this general type is shown in Figure 1.

Referring to Figure 1, there is shown a power supply comprising a transformer 10 having a primary winding 12 adapted to be connected to an alternating voltage supply source (not shown) through a pair of input terminals 14. The transformer secondary winding 16 is connected to the anodes 20 of a pair of rectifiers 18. The rectifier cathodes 22 are connected to a unidirectional voltage output terminal 24 through a "Pi" type filter network 25 comprising an inductor 26 and a pair of capacitors 28. It will be understood that a positive unidirectional voltage will be available at the terminal 24 for utilization in any suitable load network (not shown).

The primary winding 12 of the transformer 10 is connected to the input terminals 14 through the controlled winding 30 of a saturable reactor 32. The control winding 34 of the reactor 32 is connected to the power supply output terminal 24 in series with an electron tube 36. The tube 36 is provided with a control grid 38, so that the current passing through the winding 34 and the tube 36 will be a function of the control grid voltage. Thus, the tube 36 essentially comprises a voltage responsive element for controlling the reactor 32.

It can be seen that the alternating voltage supplied to the rectifiers 18 through the transformer 10 at any given time will be a function of the impedance of the controlled winding 30 at that time. Also, the impedance of the controlled winding 30 will depend on the current flow through the control winding 34, as determined by the voltage on the tube control grid 38. For automatic output voltage regulation, a feedback loop is required to apply to the tube grid 38 a control voltage proportional to the power supply output voltage.

If the filter 25 were to be included in the feedback loop, it is possible that the regulating system would oscillate. Assume, for example, that the average value of the power supply input voltage were to fluctuate periodically at a relatively low rate—say of the order of one cycle of fluctuation for every four cycles of alternating input voltage. If the filter 25 is designed to function efficiently, its electrical inertia will be such that a change in the average value of the alternating input voltage will not be reflected to the output terminal 24 in less than the period of two or more cycles of alternating input voltage. Under these conditions, if the regulator feedback loop were to include the filter 25, the regulator network might oscillate at the frequency of the input voltage fluctuations.

On the other hand, a conventional feedback loop connected directly between the input side of the filter and the tube control grid 38 would not be a satisfactory solution. The output voltage of the rectifiers 18 will include a unidirectional component, and a pulsating component having twice the frequency of the alternating input voltage. If the pulsating rectifier output voltage were to be utilized directly as a control voltage, the regulating system would respond to each pulse in the rectifier output. Thus, it appears that the control voltage provided by the feedback loop should be in the nature of a "filtered" or non-pulsating voltage, but without the delay introduced by a conventional filter.

In accordance with the invention, the feedback loop for furnishing control voltage to the grid 38 of the tube 36 comprises a system for sampling the rectifier output voltage at the input side of the filter network 25. These voltage samples are made available for comparison with a standard reference voltage to obtain a control voltage proportional to the difference between the standard and the samples. For the sake of clarity, a mechanical switching system has been shown in the drawing, although it will be evident that more complex sampling systems might be devised involving electronic switching arrangements or the like.

The voltage sampling means includes the first section 40 of a 3-section switch 40, 42, 44, and a pair of capacitors 56, 58. Each of the switch sections 40, 42, 44 has a plurality of segments (denoted by subscripts $a$, $b$, $c$ and $d$) and one or more rotary contacts 52, 54, 68, 80. These contacts are coupled to be rotated simultaneously by a synchronous motor 46 which is connected in parallel with the input terminals 14. For example, the motor 46 may be of the type shown in U. S. Patent 2,442,626.

The first switch section 40 has a semi-circular segment $40a$, and two quarter-circle segments $40b$, $40c$. The semi-circular segment $40a$ is connected to the rectifier output, at point A, through a resistor 48 which, together with the capacitor 56 (or 58), forms an integrating network. The resistor 48 limits the drain of the feedback loop on the power supply output. One of the quarter segments, $40b$, is connected to a third capacitor 50, and the other segment $40c$ is connected to ground. The switch section 40 also has two oppositely disposed rotary contacts, 52 and 54, which are connected to the capacitors 56 and 58, respectively.

The contacts 52, 54 are arranged to be rotated by the motor 46 at a frequency equal to the frequency of the alternating input voltage at the terminals 14. This, of course, will be one half the frequency of the pulsating component of rectifier output. Also, the phase of contact rotation with respect to the pulsating rectifier output voltage is made such that one or the other of the contacts 52, 54 will touch the segment $40a$ during each rectifier output pulse. Accordingly, the capacitors 56, 58 will be connected alternately to the rectifier output (point A) during succeeding pulses of rectifier output voltage. Also, each capacitor 56, 58 will be connected successively to the capacitor 50, and then to ground. Thus, during each rectifier output pulse, one of the capacitors 56, 58 will be charged to a voltage proportional to the average value of that pulse. During the succeeding output pulse, the charged capacitor (56 or 58) will be connected to transfer voltage to the capacitor 50 through the sector $40b$, and then will be discharged through the switch section $40c$. As a result, the voltage on the capacitor 50 will be adjusted during each rectifier output pulse to be proportional to the peak value of that pulse.

The voltage samples derived from the rectifier output voltage are compared with a substantially constant reference voltage as a means for detecting rectifier output voltage changes. A convenient source of reference voltage comprises a conventional gaseous voltage regulator tube 60 having an anode 61 connected to the output terminal 24 through a voltage dropping resistor 62. The regulator cathode 63 is connected to the negative side of the rectifiers 18 through a network 64. The voltage developed in the network 64 will be proportional to the power supply load current. Accordingly, changes in load current will cause corresponding changes in the reference voltage so that the system will regulate for changes in load current as well as for changes in alternating input voltage.

In order to provide selectable reference voltage level, a potentiometer type resistor 66 is connected across the regulator tube 60. By taking the reference voltage from the potentiometer tap $66a$, the regulated level of the power supply output voltage can be varied by adjusting the tap 66a.

The next portion of the feedback loop comprises means for comparing the rectifier output voltage samples with the reference voltage to obtain a control voltage proportional to the difference between the reference and the samples. Switching between the reference voltage at the potentiometer tap 66a and the samples stored on the capacitor 50 is accomplished by means of the second switch section 42.

The switch section 42 is provided with four quarter-circle segments 42a, 42b, 42c, 42d. One oppositely disposed pair of these segments, 42a and 42c, is connected to the potentiometer tap 66a. The other pair of segments, 42b and 42d, is connected to the capacitor 50. The single rotary contact 68 on the switch section 42 is connected to an input terminal 51 of a conventional alternating voltage amplifier 70.

As the contact 68 rotates, the amplifier 70 will receive, in succession, the sampled rectifier output voltage and the standard reference voltage. Since the contact 68 is rotated simultaneously with the contacts 52, 54 on the switch section 40, the amplifier 70 will receive a rectifier output sample and a reference voltage sample once during each rectifier output pulse.

The output circuit of the amplifier 70 comprises a transformer 72 having a primary winding 74 and a secondary winding 76. The secondary winding 76 is connected to a capacitor 78 and to the rotary contact 80 of the third switch section 44. This switch section 44 has four quarter-circle segments 44a, 44b, 44c and 44d, similar to the second switch section 42. One oppositely disposed pair of these segments, 44a and 44c, is connected to a capacitor 81 and to the control grid 38 in the tube 37. The other pair of segments, 44b and 44d, is connected to ground. Thus, the secondary winding 76 can be connected either in parallel with the capacitor 78 or in series with the capacitor 78 and the tube control grid 38.

During intervals when the contact 80 is touching the segment 44b or 44d the contact 68 on the switch section 42 will be touching the segment 42b or 42d. Thus, during those intervals, a voltage will be induced in the secondary winding 76 proportional to the voltage sample being amplified in the amplifier 70, and this induced voltage will be placed on the capacitor 78. During alternate intervals, when the contact 80 is touching the segment 44a or 44c, there will be induced in the secondary winding 76 a voltage proportional to the reference voltage and of polarity opposite to that of the voltage stored on the capacitor 78. These opposite polarity voltages will combine to provide a control voltage proportional to the difference between the rectifier output samples and the reference voltage. This control voltage will control the current through the tube 36 to provide the desired regulating action. The capacitor 81 will serve to store the control voltage until further correction thereof.

In reviewing the operation of the foregoing system, reference will be made to Figure 2 of the drawing in which there are shown the voltage waveforms at various points in the system of Figure 1. In order to provide a clear showing of the system operation, it is necessary to assume that the feedback loop has been opened at some point, say at the tube grid 38. Otherwise, it would be impossible to show how the voltages change at any given point in response to a change in rectifier output voltage, since the regulating action ordinarily will prevent any appreciable voltage changes. Also, it will be understood that the waveforms are greatly exaggerated for the sake of clarity.

In Figure 2a, there is shown the rectifier output voltage during eight cycles or pulses 100a–100h. It is assumed that the rectifier output voltage is increasing during the first four pulses 100a–100d, and is decreasing during the last four pulses 100e–100h. It will be understood that each rectifier output pulse corresponds to a half cycle of alternating input voltage.

In Figure 2b, there is shown the waveform of the voltage on the capacitor 56 during the eight pulses of rectifier output voltage shown in Figure 2a. In Figure 2b, the voltage on the capacitor 56 is shown starting at zero. This, of course, is due to the contact 52 touching the segment 40c. The voltage on the capacitor 56 then increases (during the first pulse 100a of Figure 2a) to a value proportional to the average pulse value. During this period, the switch contact 52 will be touching the segment 40a. During the second pulse 100b of Figure 2a, the switch contact 52 first will touch the segment 40b. During this interval, the voltages on the capacitors 56 and 50 will become equalized. Assuming that the capacitor 56 is considerably larger than the capacitor 50, the voltage will equalize substantially at the level of the voltage on the capacitor 56. Thereafter, the voltage on the capacitor 56 is shown returning to zero when the contact 52 again touches the segment 40c. Figure 2c shows the same relations for the capacitor 58, it being understood that the foregoing explanation with respect to Figure 2b also will apply to Figure 2c, with the substitution of switch contact 54 for contact 52, and capacitor 58 for capacitor 56, in each instance.

From Figures 2b and 2c, it can be seen that the sample voltages received by the capacitors 56, 58 increase during the first four pulses 100a–100d of rectifier output voltage, and decrease during the remaining four pulses 100e–100h.

In Figure 2d there is shown the waveform of the voltage on the capacitor 50 due to switching thereof between the capacitors 56 and 58. It can be seen that the voltage on the capacitor 50 increases in small increments during the first four pulses of rectifier output voltage, and decreases as the rectifier output voltage decreases.

The waveform of Figure 2e shows the voltage input to the amplifier 70 of Fig. 1 (i. e. the voltage at the switch contact 68). In Figure 2e, it is apparent that the "peak-to-peak" value of the amplifier input voltage increases during the first four cycles of rectifier output shown in Figure 2a, and decreases during the last four cycles thereof. Figure 2f is substantially a reproduction of Figure 2e, but showing the amplification effect of the amplifier 70.

In Figure 2g, there is shown the waveform of the voltage on the capacitor 81 (i. e. the voltage at the tube grid 38). As shown, the voltage on the capacitor 81 becomes more negative as the rectifier output voltage increases, and becomes less negative as the rectifier output voltage decreases. These voltage changes will effect corresponding decreases and increases in the current flowing through the control winding 34 of the reactor 32. In turn, the impedance of the controlled winding 30 of the reactor will increase and decrease, thereby adjusting the alternating input voltage of the power supply as desired.

It can be seen that the system just described avoids complications due to the inertia effects of the filtering network 25. Obviously, the principle of voltage sampling illustrated is equally applicable to other rectifier systems where it is necessary to obtain a non-pulsating voltage proportional in magnitude to the average rectifier output voltage.

Since many changes could be made in the apparatus shown and described, all within the scope and spirit of the invention, the foregoing is to be construed as illustrative and not in a limiting sense.

What is claimed is:

1. In a system for deriving from a pulsating voltage a non-pulsating unidirectional voltage proportional in magnitude to the average value of said pulsating voltage, in combination, a first capacitor, a second capacitor, a first switch having a terminal connected to said first capacitor, means including said switch to connect said first capacitor to a first source of pulsating unidirectional voltage once during each pulse in the pulsating voltage from said source, a second switch having a terminal connected to said second capacitor, a second source of substantially constant unidirectional voltage, and means including said second switch for connecting alternately said first capacitor and said second source to said second capacitor in voltage transfer relation during intervals between connections of said first capacitor to said first source.

2. In a system for converting a pulsating unidirectional voltage derived from a rectifier network into a non-pulsating unidirectional voltage, in combination, a pair of capacitors, a source of substantially constant unidirectional voltage, and switching means to connect one of said capacitors to said network once during each pulse in said pulsating voltage and to connect alternately said one of said capacitors and said source to the other of said capacitors in voltage transfer relation during intervals between connection of said one capacitor to said network, said switching means having terminals connected to said network and to said capacitors.

3. In a voltage feedback loop for a circuit of the type comprising a rectifier for converting an alternating input voltage into a pulsating unidirectional voltage and including a control device connected to vary the magnitude of said alternating voltage in accordance with a control voltage applied to said device, in combination, first means coupled to said rectifier to obtain from each pulse in said pulsating output voltage a unidirectional voltage sample proportional in magnitude to the average magnitude of each said pulse, a source of substantially constant unidirectional voltage, second means coupled to said first means and to said reference voltage source to compare each said voltage sample with the voltage of said constant voltage source to develop a control voltage proportional in magnitude to the difference between said reference voltage and said sample, and third means connecting said second means to said control device to apply said control voltage developed in said second means to said control device.

4. A voltage feedback loop as described in claim 3 wherein said constant voltage source comprises a gaseous regulator tube connected to receive unidirectional voltage from said rectifier.

5. A voltage feedback loop as described in claim 3 wherein said third means comprises a grid-controlled electron tube connected in series with said rectifier, said electron tube control grid being connected to said second means.

6. In a voltage feedback loop for a regulated power supply of the type comprising a rectifier for converting an alternating input voltage into a pulsating unidirectional voltage and including a saturable reactor having a controlled winding connected to vary the magnitude of said alternating voltage in accordance with current flow through a control winding of said reactor, in combination, an electron tube connected in series with said winding and having an anode, a cathode, and a control grid, first means to pass current through said tube and said winding, second means to derive from said pulsating output voltage a substantially constant unidirectional reference voltage, third means to derive from each pulse of said pulsating output voltage a voltage sample proportional in magnitude to the average value of each said pulse, and fourth means coupled between said control grid and said second and third means for controlling the current through said tube and said winding as a function of the difference between said reference voltage and said voltage samples.

7. A voltage feedback loop as described in claim 6 wherein said first means includes said power supply.

8. A voltage feedback loop for a regulated power supply of the type including (1) input and output terminals, (2) a rectifier connected to convert alternating voltage applied to said input terminals into pulsating unidirectional voltage, (3) a filter network connected between said rectifier and said output terminals, and (4) a saturable reactor having a controlled winding connected between said input terminals and said rectifier for controlling the magnitude of the alternating voltage reaching said rectifier as a function of current flow through a control winding of said reactor, said feedback loop comprising first means to obtain from said rectifier voltage samples proportional in magnitude to the peak value of each pulse in said pulsating voltage, a source of substantially constant unidirectional voltage, a transformer having a primary winding and a secondary winding, second means to connect said primary winding alternately to said first means and to said standard voltage source, a capacitor, an electron tube having an anode, a cathode, and a control grid, said anode and said cathode being connected in series with said control winding, and switching means to connect said secondary winding alternately (1) in parallel with said capacitor and (2) in series with said control grid and said capacitor, said switching means and said first and second means being arranged to operate in synchronism with said pulses.

9. A voltage feedback loop for a regulated power supply of the type including (1) input and output terminals, (2) a rectifier connected to convert alternating voltage applied to said input terminals into pulsating unidirectional voltage, (3) a filter network connected between said rectifier and said output terminals, and (4) a saturable reactor having a controlled winding connected between said input terminals and said rectifier for controlling the magnitude of the alternating voltage reaching said rectifier as a function of current flow through a control winding of said reactor, said feedback loop comprising a first capacitor, a first switch for connecting said capacitor to the junction of said rectifier and filter during each pulse of said pulsating voltage to charge said capacitor to a voltage proportional to the average value of each said pulse, a second capacitor, a second switch for connecting said second capacitor to said first capacitor during intervals between connection of said first capacitor to said junction, a source of substantially constant unidirectional voltage, a transformer having a primary winding and a secondary winding, a third switch to connect said primary winding alternately to said second capacitor and to said standard voltage source, a third capacitor, an electron tube having an anode, a cathode, and a control grid, said anode and said cathode being connected in series with said control winding, and a fourth switch to connect said secondary winding alternately (1) in parallel with said third capacitor and (2) in series with said control grid and said third capacitor, said switches being arranged to operate in synchronism with said pulses.

JOHN N. MARSHALL.

References Cited in the file of this patent

UNITED STATES PATENTS

| Number | Name | Date |
| --- | --- | --- |
| 1,956,416 | Elder | Apr. 24, 1934 |
| 2,078,792 | Fitz Gerald | Apr. 27, 1937 |
| 2,110,015 | Fitz Gerald | Mar. 1, 1938 |